US012263595B2

United States Patent
Schmitt et al.

(10) Patent No.: US 12,263,595 B2
(45) Date of Patent: Apr. 1, 2025

(54) METHOD AND APPARATUS FOR DETERMINING AN OPTIMIZED MOVEMENT SEQUENCE FOR A ROBOT DEVICE

(71) Applicant: Siemens Aktiengesellschaft, Munich (DE)

(72) Inventors: Philipp Sebastian Schmitt, Munich (DE); Florian Wirnshofer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1123 days.

(21) Appl. No.: 16/968,636

(22) PCT Filed: Feb. 4, 2019

(86) PCT No.: PCT/EP2019/052607
§ 371 (c)(1),
(2) Date: Aug. 10, 2020

(87) PCT Pub. No.: WO2019/162070
PCT Pub. Date: Aug. 29, 2019

(65) Prior Publication Data
US 2021/0046648 A1    Feb. 18, 2021

(30) Foreign Application Priority Data
Feb. 21, 2018  (EP) ................................ 18157895

(51) Int. Cl.
*B25J 9/16* (2006.01)
(52) U.S. Cl.
CPC ............ *B25J 9/1664* (2013.01); *B25J 9/163* (2013.01); *B25J 9/1671* (2013.01); *B25J 9/1687* (2013.01)

(58) Field of Classification Search
CPC ........ B25J 9/1664; B25J 9/163; B25J 9/1671; B25J 9/1687
See application file for complete search history.

(56) References Cited

U.S. PATENT DOCUMENTS

| 8,577,499 B2 | 11/2013 | Eliasson |
| 9,381,643 B2 | 7/2016 | Hoffmann et al. |

(Continued)

FOREIGN PATENT DOCUMENTS

| CN | 102216037 A | 10/2011 |
| CN | 105270385 A | 1/2016 |

(Continued)

OTHER PUBLICATIONS

Kim Sung-Kyun et al: "Parts assembly planning under uncertainty with simulation-aided physical reasoning"; 2017 IEEE International Conference on Robotics and Automation (ICRA), IEEE, pp. 4074-4081, XP033127210, DOI: 10.1109/ICRA.2017.7989468; 2017.

(Continued)

*Primary Examiner* — Basil T. Jos
(74) *Attorney, Agent, or Firm* — Schmeiser, Olsen & Watts, LLP

(57) ABSTRACT

A method for determining an optimized sequence of movements of a robot device for moving a first object in such a way that the first object is brought into a target position independently of an uncertainty of a position of the first object in relation to a second object and/or independently of an uncertainty of a position of the robot device is provided. The method includes: simulating movement portions of the robot device taking account of the uncertainty of the position of the first object and/or the uncertainty of the position of the robot device; and determining the optimized sequence of movements of the robot device taking account of the simulated movement portions and boundary conditions which specify at least one starting position and the target position (Continued)

of the first object. An optimized sequence of movements is determined, by which the robot device can guide the first object reliably into its target position.

15 Claims, 5 Drawing Sheets

(56) References Cited

U.S. PATENT DOCUMENTS

2019/0168383 A1  6/2019  Haddadin
2021/0023719 A1*  1/2021  Alt .................. B25J 9/1697

FOREIGN PATENT DOCUMENTS

| CN | 107505841 A | 12/2017 |
|---|---|---|
| DE | 102016213999 B3 | 7/2017 |
| EP | 0605050 A2 | 7/1994 |
| WO | WO 2017186601 A1 | 11/2017 |

OTHER PUBLICATIONS

Lavalle S. M. et al: "An Objective-Based Framework for Motion Planning Under Sensing and Control Uncertainties"; International Journal of Robotics Research, Sage Science Press, Thousand Oaks, US, Bd. 17, Nr. 1; pp. 19-42, XP000734918; ISSN: 0278-3649; pp. 19, 22-25, 28, 32-36; 1998.

Melchior N A et al: "Particle RRT for Path Planning with Uncertainty"; 2007 IEEE International Conference on Robotics and Automation—Apr. 10-14, 2007—Roma, Italy, IEEE, Piscataway, NJ, USA, pp. 1617-1624, XP031389026; ISBN: 978-1-4244-0601-2; 2007.

Yifeng Huang et al: "Collision-probability constrained PRM for a manipulator with base pose uncertainty"; Intelligent Robots and Systems, 2009. IROS 2009. IEEE/RSJ International Conference on, IEEE, Piscataway, NJ, USA, pp. 1426-1432, XP031580528; ISBN: 978-1-4244-3803-7; 2009.

PCT International Search Report mailed May 20, 2019 corresponding to PCT international Application No. PCT/EP2019/052607 filed Feb. 4, 2019.

Mason Matthew T.: "Compliance and Force Control for Computer Controlled Manipulators", IEEE Transactions on Systems, Man and Cybernetics., Bd. 11, Nr. 6, Jan. 1, 1981 (Jan. 1, 1981), Seiten 418-432, XP093197828, US ISSN: 0018-9472, 001: 10.1109/TSMC.1981.4308708.

* cited by examiner

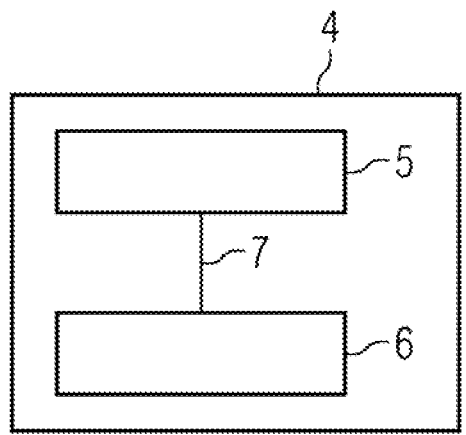

METHOD AND APPARATUS FOR DETERMINING AN OPTIMIZED MOVEMENT SEQUENCE FOR A ROBOT DEVICE

CROSS-REFERENCE TO RELATED APPLICATIONS

This application claims priority to PCT Application No. PCT/EP2019/052607, having a filing date of Feb. 4, 2019, which is based on EP Application No. 18157895.6, having a filing date of Feb. 21, 2018, the entire contents both of which are hereby incorporated by reference.

FIELD OF TECHNOLOGY

The following relates to a method for determining an optimized movement sequence for a robot device and to an apparatus for performing such a method.

BACKGROUND

Robot devices can be used in industrial installations, for example, in order to move and/or bring together items, in particular workpieces. General reference can be made to a first item being brought to a target pose with reference to a second item by a movement sequence of the robot device. It may be necessary for the movement sequence to be optimized such that the first item is brought to the target pose correctly even in the event of disturbances and/or in the event of errors in model representations of the items.

The document "An objective-based framework for motion planning under sensing and control uncertainties" by S. M. Lavalle et al. (International journal of robotics research, Jan. 1, 1998) relates to the optimization of robot movement sequences. This is accomplished by simulating and evaluating future states while taking into consideration an uncertainty in the pose of items that are to be moved.

The document "Parts assembly planning under uncertainty with simulation-aided physical reasoning" by S. Kim et al. (2017 IEEE conference on robotics and automation, May 29, 2017) describes optimization of a bringing-together of items by a robot.

The document "Collision-probability constrained PRM for a manipulator with base pose uncertainty" by Y. Huang et al. (Intelligent robots and Systems, 2009) is concerned with the movement planning for a robot arranged on a mobile platform.

SUMMARY

An aspect relates to improved determination of an optimized movement sequence for a robot device.

According to a first aspect, a method for determining an optimized movement sequence for a robot device for moving a first item such that the first item is brought to a target pose regardless of an uncertainty of a pose of the first item with reference to a second item and/or regardless of an uncertainty of a pose of the robot device is proposed. The method comprises:

simulating movement sections of the robot device while taking into consideration the uncertainty of the pose of the first item and/or the uncertainty of the pose of the robot device; and determining an optimized movement sequence of the robot device while taking into consideration the simulated movement sections and constraints that indicate at least one starting pose and the target pose of the first item.

The robot device is for example a robot, a robot arm or a device that can perform a specified movement sequence and/or movement sections. The robot device can be used in an automated manufacturing process, in particular in an industrial installation, or in a packaging process.

The robot device is in particular suitable for bringing the first item to the target pose with reference to the second item. In this instance, the first and second items, subsequently also referred to as "items" together, can be brought together, for example. The first item can be inserted into the second item or placed onto the second item by the robot device, in order to subsequently attach the items to one another. The final pose of the first item with reference to the pose of the second item can be referred to as the target pose.

The "pose" of an object is understood to mean in particular a position and/or an orientation of this object. The terms "target pose" and "starting pose" can be defined analogously.

A movement sequence can be understood to mean a succession of individual movements of the robot device. The movement sequence can comprise a multiplicity of movement sections. In particular, multiple movement sections are able to be put together such that they form a movement sequence. The movement sequence and/or the movement section can indicate for example the direction in which the robot device is supposed to move the first item along a coordinate system, the speed at which the robot device is supposed to move the first item and/or the force that the robot device is supposed to apply in doing so, in particular within the context of impedance control.

The simulation of the movement sections involves in particular physical simulations. The movement sections can be simulated by using a simulator. The simulator is for example a solid simulator that reproduces the dynamic system (first item and robot device). In particular, each movement section can be described by a movement section starting pose and a movement section target pose. During the simulation, random movement sections can be determined starting from an initial pose. Multiple instances of the simulated movement sections can correlatively form a movement sequence.

The simulator is in particular suitable for simulating complex movement sections. In fact, the movement sequence can comprise movements in up to six degrees of freedom (three rotational and three translational). Moreover, the contact by the robot device with the first item and/or the contact between the two items can give rise to a certain amount of nonlinearity that is difficult to model. Moreover, the process in which the first item is brought to the target pose is a dynamic process, which is why at least speeds can be included in the simulation as well.

The uncertainty of the pose of the first item refers in particular to an uncertainty about precisely where the first item is present. The uncertainty of the pose of the first item is in particular defined with reference to the second item, which is why uncertainties of the pose of the second item can also be covered by the uncertainty of the pose of the first item. The uncertainty of the pose of the first item can arise as a result of the first and/or second item having a certain amount of elasticity and/or a specific coefficient of friction, which are not taken into consideration by model representations of the first and/or second item. The uncertainty of the pose of the first item is in particular not always constant and can differ from item to item.

The uncertainty of the robot device describes in particular an uncertainty about precisely where the robot device is located. The uncertainty of the robot device can also be a reflection of imprecise model representations of the robot device. Further, the uncertainty of the robot device can represent a disruption in a movement of the robot device.

The method described can involve multiple movement sections, in particular twenty movement sections or more, being simulated. Each of these simulations can take into consideration the uncertainty of the pose of the first item and/or the uncertainty of the pose of the robot device. Hereinbelow, the uncertainty of the pose of the first item and that of the robot device are referred to together as "uncertainty of the pose".

In particular, each simulation of a movement section takes into consideration a different value for the uncertainty of the pose. It is moreover possible for properties of the robot device, also robot device properties, and/or item properties of the first and/or second item, which are described in more detail hereinbelow, to be taken into consideration.

The simulation of the movement sections results in particular in a multiplicity of simulated movement sections being obtained. The individual simulated movement sections are subsequently evaluated with regard to the quality thereof, for example. They can also be combined to form an optimized movement sequence.

The evaluation of the simulated movement sections leads in particular to an optimized movement sequence for the robot device being determined. To determine the optimized movement sequence, the starting pose and the target pose of the first item can be taken into consideration as constraints. The starting pose is in particular a pose of the first item before the robot device moves the first item in accordance with a movement sequence and guides it into the target pose.

The optimized movement sequence is a movement sequence that in particular allows the robot device to guide the first item into the target pose, even if there is an uncertainty for the pose of the first item and/or the robot device. That is to say that two different first items moved by the robot device along the same optimized movement sequence can both be guided into the target pose, even if they are affected by different uncertainties.

The determination of an optimized movement sequence allows in particular reliable movement of the first item to the target pose. In particular an optimized movement sequence is provided that guides the first item into the desired target pose—despite model errors and other variable disruptions. It is for example not necessary to use sophisticated methods to try to reduce the model errors as far as possible, and/or to rule out disruptions as far as possible.

The optimized movement sequence can be determined flexibly because such determination is performed automatically. In particular, it is possible for an optimized movement sequence to be determined even for a movement that is supposed to be performed only a single time or only a few times with the robot device, because the optimized movement sequence can be determined with little effort. As a result of the optimized movement sequence being determined while taking into consideration the uncertainty of the pose of the first item and/or the uncertainty of the pose of the robot device, the method described can be used in particularly versatile fashion. When determining the optimized movement sequence, it is also possible to refer to planning, in particular kinodynamic planning, of the optimized movement sequence.

In embodiments, the method further comprises performing the optimized movement sequence with the robot device such that the first item is guided into the target pose with reference to the second item.

According to one embodiment, the robot device has a compensation property that is used to partially compensate the robot device for the uncertainty of the pose of the first item and/or for the uncertainty of the pose of the robot device; and wherein the determination of the optimized movement sequence comprises determining an optimized compensation property of the robot device, or the movement sections are furthermore simulated while taking into consideration a predetermined compensation property of the robot device.

The compensation property of the robot device, which is used to partially compensate the robot device for the uncertainty of the pose, is also referred to as "compliance" hereinbelow. This is for example a spring action or damping behavior of the robot device. Moreover, the robot device can also be compensated for the uncertainty of the pose on the basis of a compliance control, in particular on the basis of an impedance monitoring, of the robot device.

The compliance can be determined, in particular calculated, when determining the optimized movement sequence. Alternatively, the compliance may already be an input value for the simulation of the movement sections, so that the movement sections are simulated while taking into consideration a predetermined compliance of the robot device.

The compliance of the robot device is used in particular to prevent the robot device from destroying itself, the first item and/or the second item because it grips beside it/them on account of one of the uncertainties.

According to a further embodiment, the uncertainty of the pose of the first item and/or of the robot device is a selected value of a statistical uncertainty distribution.

In particular, the uncertainty of the pose of the first item is modelled on the basis of a first uncertainty distribution and the uncertainty of the pose of the robot device is modelled on the basis of a further uncertainty distribution. The uncertainty can in particular assume different values. A distribution of these values may be conveyed in the statistical uncertainty distribution. The uncertainty of the pose of the first item and/or of the robot device, the value of which is used when simulating the movement sections, can be selected from this uncertainty distribution.

According to a further embodiment, the uncertainty of the pose of the first item and/or of the robot device is selected from the statistical uncertainty distribution by random sampling.

That is to say in particular that the uncertainty of the pose of the first item and/or of the robot device is selected from the uncertainty distribution on a random basis. The selection by random sampling serves in particular to reproduce the uncertainty density function.

According to a further embodiment, the multiple movement sections are simulated while taking into consideration different values of the uncertainty of the pose of the first item and/or of the robot device.

For example a different uncertainty value is used for multiple simulations of the same movement section. These different uncertainty values can be taken from the statistical uncertainty distribution.

According to a further embodiment, the simulation of the movement sections involves multiple movement sections that all set out from the same movement section starting pose of the robot device being determined at random. The method further comprises:

randomly selecting a movement section target pose for one of the multiple simulated movement sections and stipulating this selected movement section target pose as a new movement section starting pose;

repeating the simulation of the movement sections, the random selection of a movement section target pose and the stipulation of the selected movement section target pose as a new movement section starting pose until a movement section target pose of one of the multiple simulated movement sections is in a predetermined target area.

The starting point for simulating the movement sections is in particular initially the movement section starting pose. The movement section starting pose can be the starting pose of the first item. Multiple movement sections can be simulated from this movement section starting pose. These movement sections are in particular random movement sections that all have the movement section starting pose as initial pose. The individual simulated movement sections can have different movement section target poses, however.

During the simulation, a single movement section target pose is in particular randomly selected from these multiple movement section target poses. The selected movement section target pose is defined as a new starting point, that is to say as a new movement section starting pose. From this new movement section starting pose, multiple movement sections can again be randomly simulated, which in turn can have different (new) movement section target poses. One of the (new) movement section target poses can again be randomly selected in order to use it as further movement section starting pose.

The steps of simulating the movement sections, randomly selecting a movement section target pose and stipulating the selected movement section target pose as new movement section starting pose can be iteratively repeated. In particular, they are repeated until it is detected that a movement section target pose of a simulated movement section is in the target area. The target area comprises the target pose in particular.

When a movement section target pose is in the target area, the simulation can be stopped and the individual movement sections that have led to the target area can be put together so as to obtain the optimized movement sequence.

According to a further embodiment, the optimized movement sequence of the robot device is determined by putting together at least two of the simulated movement sections.

According to a further embodiment, the simulation of the movement sections takes into consideration at least one robot device property, a first item property of the first item and/or a second item property of the second item.

According to a further embodiment, the robot device property comprises at least:

a maximum force appliable by the robot device;
a model representation of the robot device; and/or
possible movements of the robot device.

The maximum force appliable by the robot device is in particular a force limit of the robot device along a specific direction. The model representation of the robot device can be a CAD (Computer Aided Design) model and for example indicate how large the robot device is. The possible movements of the robot device also denote in particular those movements that the robot device can perform.

According to a further embodiment, the first and/or second item property (subsequently also referred to as "item properties" together) comprises at least:

a coefficient of friction of the first and/or the second item;
a size and/or shape of the first and/or the second item;
a model representation of the first and/or the second item;
a weight of the first and/or the second item; and/or
a material property of the first and/or the second item.

The model representation of the first and/or the second item can be a CAD model. As a result of the optimized movement sequence being determined while taking into consideration the robot device property and/or the item properties, the optimized movement sequence can be determined in an application-specific manner.

According to a further embodiment, the determination of the optimized movement sequence comprises:

calculating a cost function for each simulated movement section; and
determining the optimized movement sequence on the basis of the calculated cost functions.

The cost function is in particular an indication of how suitable a simulated movement section is.

According to one embodiment, the method further comprises:

determining multiple movement sequences on the basis of the simulated movement sections;
calculating a total cost function for each movement sequence on the basis of the cost functions of the movement sections of the respective movement sequences; and
selecting the movement sequence having the minimum total cost function from the multiple movement sequences as the optimized movement sequence.

A movement sequence compiled from multiple movement sections can have a total cost function that is a sum of the cost functions of the individual movement sections of the movement sequence. The optimized movement sequence can be the movement sequence that, after multiple passes, is the one whose total cost function is a minimum.

According to one embodiment, the method further comprises:

determining a first movement sequence on the basis of the simulated movement sections;
determining a movement sequence portion that comprises at least two movement sections;
calculating the cost function of the movement sequence portion; and
pursuing the movement sequence portion further if the cost function of the movement sequence portion is lower than a cost function of the first movement sequence.

A movement sequence is determined in steps in particular. With every step, a movement section can be appended to the existing movement sequence portion and a check can be performed to determine whether the cost function of the resultant movement sequence portion exceeds a predetermined value. The predetermined value can be the cost function of a previously determined movement sequence, namely the first movement sequence. If the cost function of the movement sequence portion is already higher than the cost function of the first movement sequence, this movement sequence portion is not pursued further, in particular. That is to say for example that no further movement sections are appended in order to obtain a complete movement sequence. In particular, it is possible to ensure that only movement sequence portions that are good in respect of the cost function are pursued further. This allows the computational effort to be significantly reduced. In particular, a solution for the optimized movement sequence can be found with little computational effort.

According to a further embodiment, the cost function contains an indication of:
a quality of the simulated movement section;
a length of a path corresponding to the simulated movement section;
a duration of a performance of the simulated movement section;
an energy consumption of the performance of the simulated movement section; and/or
a force occurring on the first and/or second item during the performance of the simulated movement section.

The path, also path of movement, is in particular a route along which the first item moves when the robot device performs the simulated movement section.

According to a further embodiment, the uncertainty of the pose of the first item represents an uncertainty of a model used for the first and/or second item and/or a production tolerance of the first and/or second item.

The uncertainty of the model used can be for example an error in the model representation of the first item and/or of the second item. Such an error can be for example that the model does not take into consideration the elasticity of the first and/or second item.

According to a second aspect, a computer program product (non-transitory computer readable storage medium having instructions, which when executed by a processor, perform actions) that prompts the performance of the method according to the first aspect or according to an embodiment of the first aspect on a program-controlled device is proposed.

A computer program product, such as e.g. a computer program means, can be provided or supplied for example as a storage medium, such as e.g. a memory card, USB stick, CD-ROM, DVD, or else in the form of a downloadable file from a server in a network. This can be effected for example in a wireless communication network by the transmission of an appropriate file containing the computer program product or the computer program means.

According to a third aspect, an apparatus for determining an optimized movement sequence for a robot device for moving a first item such that the first item is brought to a target pose regardless of an uncertainty of a pose of the first item with reference to a second item and/or regardless of an uncertainty of a pose of the robot device is proposed. The apparatus comprises:
a simulation unit for simulating movement sections of the robot device while taking into consideration the uncertainty of the pose of the first item and/or the uncertainty of the pose of the robot device; and
a determination unit for determining the optimized movement sequence of the robot device while taking into consideration the simulated movement sections and constraints that indicate at least one starting pose and the target pose of the first item.

The respective unit, for example the simulation unit or the determination unit, can be implemented in hardware and/or also in software. In the case of a hardware implementation, the respective unit can be in the form of an apparatus or in the form of part of an apparatus, for example in the form of a computer or in the form of a microprocessor or in the form of a control computer of a vehicle. In the case of a software implementation, the respective unit can be in the form of a computer program product, in the form of a function, in the form of a routine, in the form of part of a program code or in the form of an executable object.

According to one embodiment, the apparatus is suitable for performing the method according to the first aspect or according to an embodiment of the first aspect.

The embodiments and features described for the proposed method apply for the proposed apparatus accordingly.

Further possible implementations of embodiments of the invention also encompass combinations not explicitly mentioned of features or embodiments described above or below in respect of the exemplary embodiments. A person skilled in the art will also add individual aspects as improvements or supplementations to the respective basic form of embodiments of the invention.

BRIEF DESCRIPTION

Some of the embodiments will be described in detail, with reference to the following figures, wherein like designations denote like members, wherein:

FIG. 6 shows an apparatus for determining an optimized movement sequence for a robot device according to an embodiment.

DETAILED DESCRIPTION

Figure 1:
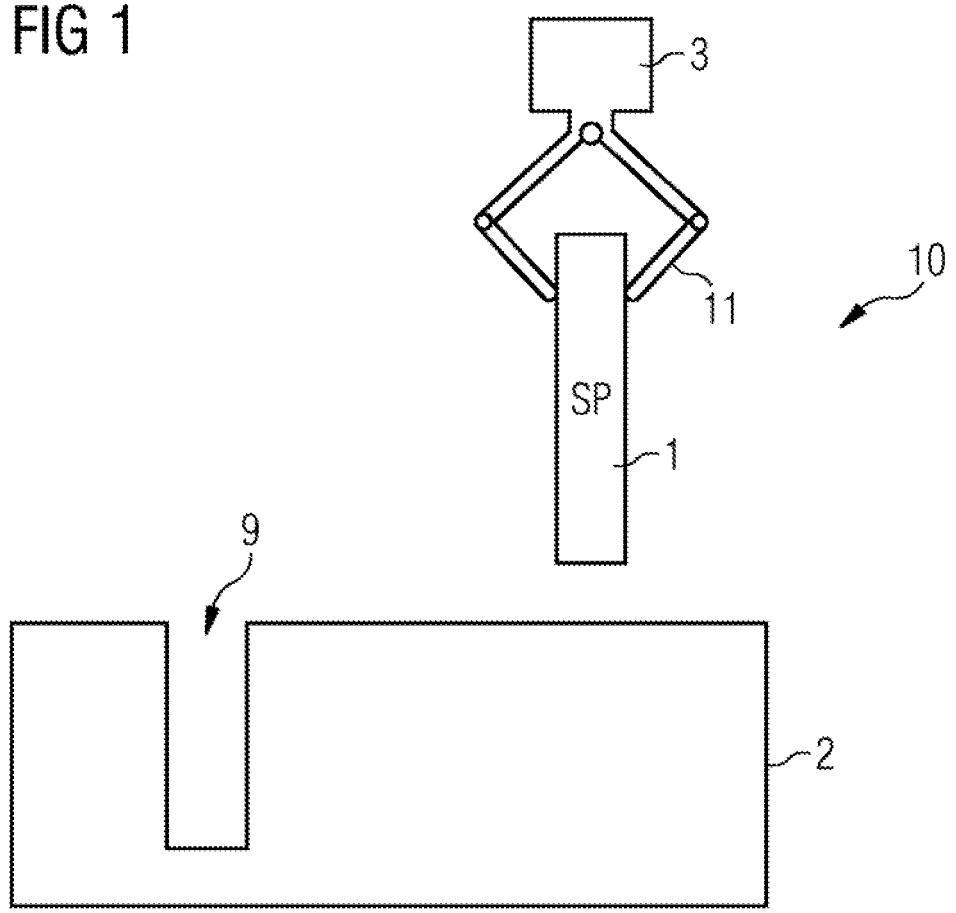
FIG. 1 shows an example of a manufacturing apparatus in which a first item is in a starting pose.

FIG. 1 shows an example of a manufacturing apparatus 10. The manufacturing apparatus 10 is part of an automated industrial system. It comprises a robot device 3, a first item 1 and a second item 2.

The first item 1 is a cylindrical workpiece made from plastic. The size of the first item 1 is chosen such that the first item 1 can be inserted into a drill opening 9 in the second item 2. The second item 2 is another plastic part.

The robot device 3 is a robot that is used for assembling components. The robot device 3 is programmable to perform different movement sequences. For example it can guide the first item 1 into the drill opening 9 in the second item 2. To this end, the robot device 3 comprises a robot arm 11 that can grip the first item 1.

Figure 2:
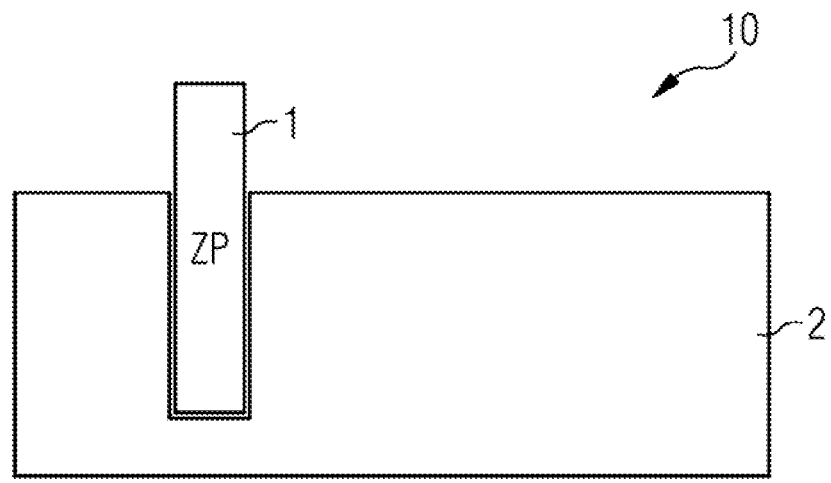
FIG. 2 shows an example of the manufacturing apparatus in which the first item is in a target pose.

FIG. 1 depicts how the robot arm 11 holds the first item 1 in a starting pose SP. On the basis of a suitable programmed movement sequence, the robot device 3 guides the first item 1 into the drill opening 9 in the second item 2, so that the first item 1 reaches a target pose ZP. This is depicted in FIG. 2.

The pose of the first item 1 denotes a combination of a position and an orientation of the first item and is defined relative to a pose (position and orientation) of the second item 2.

The pose of the first item 1 with reference to the second item 2 has a certain level of uncertainty. This uncertainty arises on the basis of the physical properties of the first and second items 1, 2, which are difficult to assess and model. These physical properties can be for example the elasticity or the coefficient of friction of the material that forms the first and/or second item 1, 2.

Furthermore, the pose of the robot device 3 also has a certain level of uncertainty.

The movement sequence specified for the robot device 3 guides the first item 1 reliably into its target pose ZP regardless of the uncertainty of the pose of the first item 1 and regardless of the uncertainty of the pose of the robot device 3. Such a movement sequence is called an "optimized movement sequence" in particular.

The robot device 3 has a compensation property (also "compliance" hereinbelow) that is used to at least partially compensate for the uncertainty of the pose of the first item 1 and/or the uncertainty of the pose of the robot device 3. To this end, the robot device 3 has a spring system, not depicted.

Figure 3:
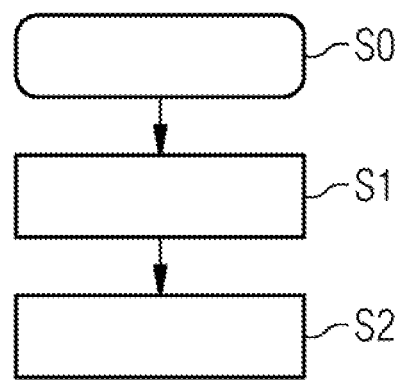
FIG. 3 shows a method for determining an optimized movement sequence for a robot device according to a first embodiment.

The optimized movement sequence can be determined using a method for determining the optimized movement sequence of the robot device 3. FIG. 3 shows an example of such a method according to a first embodiment.

In an (optional) preparation step S0, the robot device 3 and the two items 1, 2 are provided.

In a step S1, movement sections of the robot device 3 are simulated. A movement section corresponds to a sequence of movements of the robot device 3. The movement sections are simulated using a solid simulator. In total, at least thirty movement sections are simulated. The simulations of the movement sections are all effected while taking into consideration the same predetermined robot device properties and the same first and second item properties of the first and second items 1, 2. The robot device properties are maximum forces appliable by the robot device 3 and possible movements of the robot device 3. The item properties are a CAD model representation of the first and second items 1, 2 and material properties of these items 1, 2. These properties can be specified for the simulator by a user.

The simulation of the different movement sequences takes into consideration different values of the uncertainty of the pose of the first item 1 and of the uncertainty of the pose of the robot device 3. The uncertainty values are chosen from statistical uncertainty distributions on a random basis.

In a step S2, the movement sections simulated in step S1 are used to determine an optimized movement sequence. This is accomplished while taking into consideration the starting pose SP and the target pose ZP of the first item 1. In step S2, multiple instances of the simulated movement sections are put together, so that they form a movement sequence for the robot device 3 that allows the robot device 3 to guide the first item 1 from the starting pose SP into the target pose ZP. This movement sequence combined from multiple simulated movement sections corresponds to the optimized movement sequence. On the basis of the optimized movement sequence, the robot device 3 can guide the first item 1 reliably into the target pose ZP regardless of the uncertainty of the pose of the first item 1 and regardless of the uncertainty of the pose of the robot device. The resilience to be applied by the robot device 3 is determined as part of the optimized movement sequence.

Figure 4:
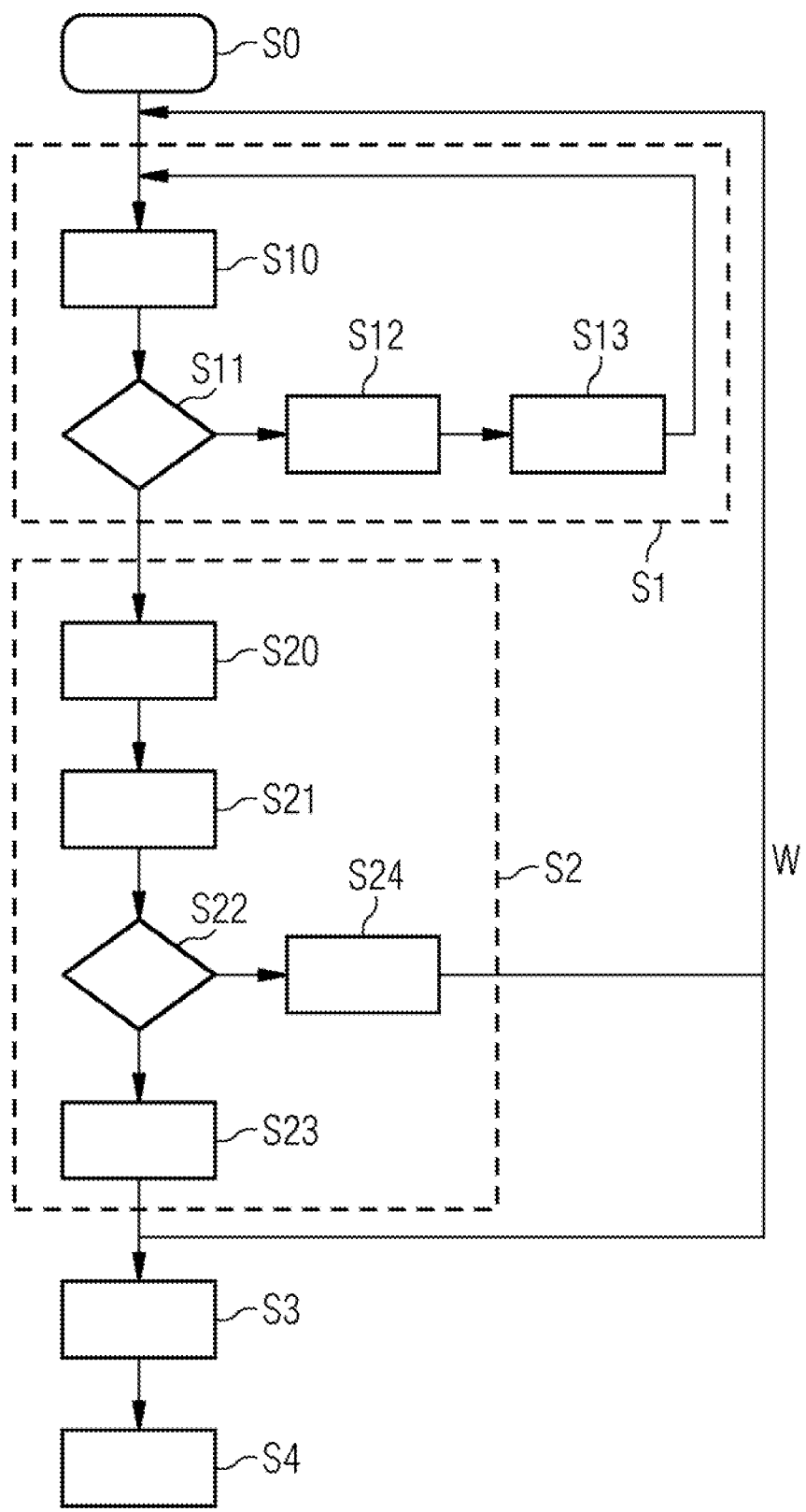
FIG. 4 shows a method for determining an optimized movement sequence for a robot device according to a second embodiment.

FIG. 4 shows a method for determining an optimized movement sequence for a robot device according to a second embodiment. Step S0 of the method according to the second embodiment corresponds to the step S0 that has already been described with regard to the method according to the first embodiment (FIG. 3), and is therefore not described again.

In the methods according to the second embodiment, the simulation step S1 comprises steps S10-S13. In step S10, multiple movement sections that all set out from the same movement section starting pose of the robot device are determined at random. The movement section starting pose for the first pass is the starting pose of the first item 1. The simulated movement sections have different movement section target poses.

In step S11, it is determined whether one of the movement section target poses is in a target area. The target area can comprise the target pose of the first item 1.

If there is no movement section target pose in the target area, steps S12 and S13 are performed. In step S12, a movement section target pose of one of the multiple simulated movement sections is selected at random. In step S13, the movement section target pose selected in step S12 is stipulated as a new movement section starting pose.

After steps S12 and S13, steps S10 and S11 are performed again. That is to say that multiple movement sections are again simulated, which this time all have the same new movement section starting pose as movement section starting pose.

Steps S10, S11 and possibly S12 and S13 are repeated until it is determined in step S11 that one of the movement section target poses obtained on the basis of the simulation is in the target area.

In this case, step S2 is performed. Step S2 comprises steps S20, S21, S22, S23 and S24. In step S20, the simulated movement sections that have led to there being a movement section target pose in the target area are combined. These combined movement sections form a movement sequence.

In step S21, a total cost function of the movement sequence formed in step S20 is calculated. This is accomplished by calculating and adding up cost functions of the individual movement sections that form the movement sequence. The cost function in this instance is an indication of a duration of the performance of the simulated movement section. It is desirable to minimize the duration of the performance of the whole movement sequence because this allows a manufacturing volume for a given time to be increased. The calculation of the total cost function therefore serves to simplify determination of the optimized movement sequence.

In step S22, it is determined whether the total cost function is lower than a previously calculated total cost function of a previously determined (first) movement sequence. If this is the case, the movement sequence determined in step S20 is kept (step S23). If the total cost function is not lower than the previously calculated total cost function of the previously determined (first) movement sequence, the movement sequence determined in step S20 is rejected (step S24). If the movement sequence determined in step S20 is the first movement sequence, step S23 is performed.

Steps S1 and S2 can be repeated as often as desired in order to optimize the movement sequence determined in step S20. The repetition is depicted in FIG. 4 using the arrow W. After a predetermined number of repetitions, i.e. passes, the last movement sequence kept in step S23 is determined as the optimized movement sequence in a step S3.

In a step S4, the robot device 3 moves the first item 1 along the optimized movement sequence stipulated in step S3 and in so doing guides the first item 1 into the target pose ZP. This moving of the first item 1 is shown in FIG. 5.

Figure 5:
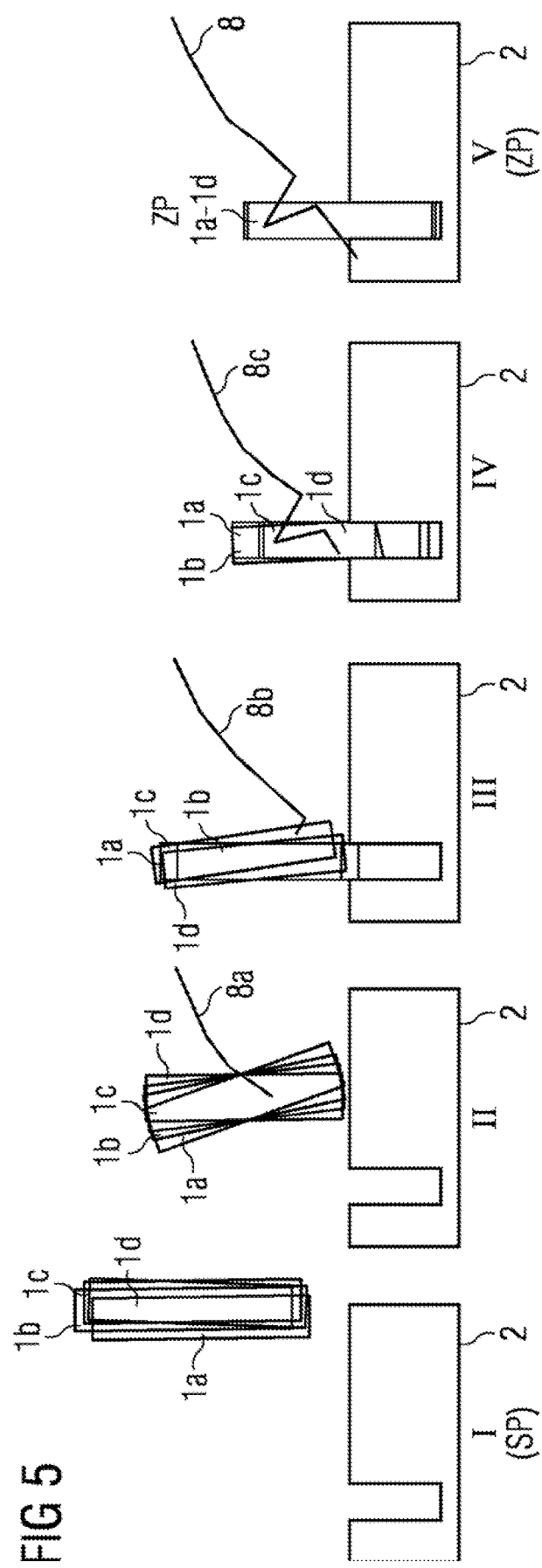
FIG. 5 shows an example of a first item being moved along an optimized movement sequence.

FIG. 5 shows an example of a first item 1*a*-1*d* being moved along an optimized movement sequence 8. FIG. 5 depicts four first items 1*a*-1*d*. These four first items 1*a*-1*d* correspond to the first item 1 described with reference to FIG. 1. The first items 1*a*-1*d* differ from one another by virtue of their precise pose with reference to the second item 2, but are otherwise identical. The pose differences correspond to the previously described uncertainty of the pose of the first item 1a-1d and the previously described uncertainty of the pose of the robot device 3.

FIG. 5 depicts poses I-V of the first items 1a-1d, wherein the pose I corresponds to the starting pose SP of the first items 1a-1d and the pose V corresponds to the target pose ZP of the first items 1a-1d. The poses II, III and IV correspond to poses of the first items 1a-1d between the starting pose SP and the target pose ZP.

In each of the poses I-V depicted in FIG. 5, the first items 1a-1d are depicted above one another. Only a single first item 1a-1d is guided with respect to the second item 2 at each time, however. The first items 1a-1d are moved by the robot device 3, although this is not depicted in FIG. 5 for reasons of clarity.

In each of the poses II, III and IV, the portion 8a-8c of the optimized movement sequence 8 along which the robot device 3 has guided the first item 1 is depicted. The whole optimized movement sequence 8 is visible in the pose V.

The first items 1a-1d, despite the differences in the poses thereof, are all guided into the target pose ZP along the same optimized movement sequence 8. In the target pose ZP, all first items 1a-1d are arranged correctly in the drill opening 9 in the second item 2. The optimized movement sequence therefore allows the first items 1a-1d to be reliably guided into their target pose ZP, regardless of uncertainties in the poses of the first items 1a-1d and regardless of the uncertainties in the pose of the robot device 3.

FIG. 6 shows an apparatus 4 for determining an optimized movement sequence for a robot device 3 according to one embodiment. The apparatus 4 comprises a simulation unit 5 and a determination unit 6, which are connected to one another via an internal line 7, for example.

The simulation unit 5 is suitable for simulating movement sections of the robot device 3 while taking into consideration the uncertainty of the pose of the first item 1, 1a-1d and/or the uncertainty of the pose of the robot device 3. The determination unit 6 is suitable for determining the optimized movement sequence of the robot device 3 while taking into consideration the simulated movement sections and constraints that indicate at least the starting pose SP and the target pose ZP of the first item 1, 1a-1d.

The apparatus 4 is suitable for performing the method for determining the optimized movement sequence according to the first and/or second embodiment (FIGS. 3 and 4).

Although embodiments of the present invention have been described on the basis of exemplary embodiments, it is modifiable in a wide variety of ways. For example it is possible to determine movement sequence portions and to calculate a cost function for these movement sequence portions while the movement sections are actually being simulated. In particular, only movement sequence portions that have a cost function that is lower than a cost function of a previously determined movement sequence are pursued further. It is also conceivable for the first item 1 to be put or pressed onto the second item 2 by the robot device 3. In addition or as an alternative to indicating the duration of the performance of the simulated movement section, the cost function can also indicate an energy consumption of the performance of the simulated movement section and/or a force occurring on the first item, for example.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for determining an optimized movement sequence for a robot device for moving a first item such that the first item is brought to a target pose regardless of an uncertainty of a pose of the first item with reference to a second item and/or regardless of an uncertainty of a pose of the robot device, wherein the method comprises:
simulating movement sections of the robot device while taking into consideration the uncertainty of the pose of the first item and/or the uncertainty of the pose of the robot device; and
determining the optimized movement sequence of the robot device while taking into consideration the simulated movement sections and constraints that indicate a starting pose and the target pose of the first item, wherein
the robot device has a compliance that is used to partially compensate the robot device for the uncertainty of the pose of the first item and/or the uncertainty of the pose of the robot device; and wherein the movement sections are furthermore simulated while taking into consideration a predetermined compliance of the robot device.

2. The method as claimed in claim 1, wherein the determination of the optimized movement sequence comprises determining an optimized compliance of the robot device.

3. The method as claimed in claim 1, wherein the uncertainty of the pose of the first item and/or of the robot device is a selected value, in particular a value selected by random sampling, of a statistical uncertainty distribution.

4. The method as claimed in claim 1, wherein the multiple movement sections are simulated while taking into consideration different values of the uncertainty of the pose of the first item and/or of the robot device.

5. The method as claimed in claim 1, wherein the simulation of the movement sections involves multiple movement sections that all set out from the same movement section starting pose of the robot device being determined at random; wherein the method further comprises:
randomly selecting a movement section target pose for one of the multiple simulated movement sections and stipulating this selected movement section target pose as a new movement section starting pose; and
repeating the simulation of the movement sections, the random selection of a movement section target pose and the stipulation of the selected movement section target pose as a new movement section starting pose until a movement section target pose of one of the multiple simulated movement sections is in a predetermined target area.

6. The method as claimed in claim 1, wherein the optimized movement sequence of the robot device is determined by putting together at least two of the simulated movement sections.

7. The method as claimed in claim 1, wherein the simulation of the movement sections takes into consideration a robot device property, a first item property of the first item and/or a second item property of the second item;
wherein the robot device property comprises:
a maximum force appliable by the robot device;
a model representation of the robot device; and/or
possible movements of the robot device; and/or
wherein the first and/or second item property comprises:
- a coefficient of friction of the first item and/or of the second item;
- a size and shape of the first item and/or of the second item;
- a model representation of the first item and/or of the second item;
- a weight of the first item and of the second item; and/or
- a material property of the first item and/or of the second item.

8. The method as claimed in claim 1, wherein the determination of the optimized movement sequence comprises:
- calculating a cost function for each simulated movement section; and
- determining the optimized movement sequence on the basis of the calculated cost functions.

9. The method as claimed in claim 8, wherein determining multiple movement sequences on the basis of the simulated movement sections;
- calculating a total cost function for each movement sequence on the basis of the cost functions of the movement sections of the respective movement sequences; and
- selecting the movement sequence having the minimum total cost function from the multiple movement sequences as the optimized movement sequence.

10. The method as claimed in claim 8, wherein determining a first movement sequence on the basis of the simulated movement sections;
- determining a movement sequence portion that comprises at least two movement sections;
- calculating the cost function of the movement sequence portion; and
- pursuing the movement sequence portion further if the cost function of the movement sequence portion is lower than a cost function of the first movement sequence.

11. The method as claimed in claim 1, wherein the cost function contains an indication of:
- a quality of the simulated movement section;
- a length of a path corresponding to the simulated movement section;
- a duration of a performance of the simulated movement section;
- an energy consumption of the performance of the simulated movement section; and/or
- a force occurring on of the first and/or second item during the performance of the simulated movement section.

12. The method as claimed in claim 1, wherein the uncertainty of the pose of the first item represents an uncertainty of a model used for the first and/or second item and a production tolerance of the first and/or second item.

13. A computer program product, comprising a computer readable hardware storage device having computer readable program code stored therein, said program code executable by a processor of a computer system to implement a method that prompts the performance of the method as claimed in claim 1 on a program-controlled device.

14. An apparatus for determining an optimized movement sequence for a robot device for moving a first item such that the first item is brought to a target pose regardless of an uncertainty of a pose of the first item) with reference to a second item and/or regardless of an uncertainty of a pose of the robot device, wherein the apparatus comprises:
- a simulation unit for simulating movement sections of the robot device while taking into consideration the uncertainty of the pose of the first item and the uncertainty of the pose of the robot device; and
- a determination unit for determining the optimized movement sequence of the robot device while taking into consideration the simulated movement sections and constraints that indicate at least one starting pose and the target pose of the first item, wherein
- the robot device has a compliance that is used to partially compensate the robot device for the uncertainty of the pose of the first item and/or the uncertainty of the pose of the robot device; and wherein
- the movement sections are furthermore simulated by the simulation unit while taking into consideration a predetermined compliance of the robot device.

15. The apparatus as claimed in claim 14 for performing a method for determining an optimized movement sequence for a robot device for moving a first item, such that the first item is brought to a target pose regardless of an uncertainty of a pose of the first item with reference to a second item and/or regardless of an uncertainty of a pose of the robot device, wherein the method comprises:
- simulating movement sections of the robot device while taking into consideration the uncertainty of the pose of the first item and/or the uncertainty of the pose of the robot device; and
- determining the optimized movement sequence of the robot device while taking into consideration the simulated movement sections and constraints that indicate a starting pose and the target pose of the first item, wherein
- the robot device has a compliance that is used to partially compensate the robot device for the uncertainty of the pose of the first item and/or the uncertainty of the pose of the robot device; and wherein the movement sections are furthermore simulated while taking into consideration a predetermined compliance of the robot device.

* * * * *